Nov. 17, 1953  F. C. McNICOL  2,659,843
ELECTRICAL CONTROL APPARATUS
Filed May 22, 1950  4 Sheets-Sheet 1

INVENTOR.
Forrest C. McNicol.
BY
ATTORNEY

Nov. 17, 1953  F. C. McNICOL  2,659,843
ELECTRICAL CONTROL APPARATUS
Filed May 22, 1950  4 Sheets-Sheet 2
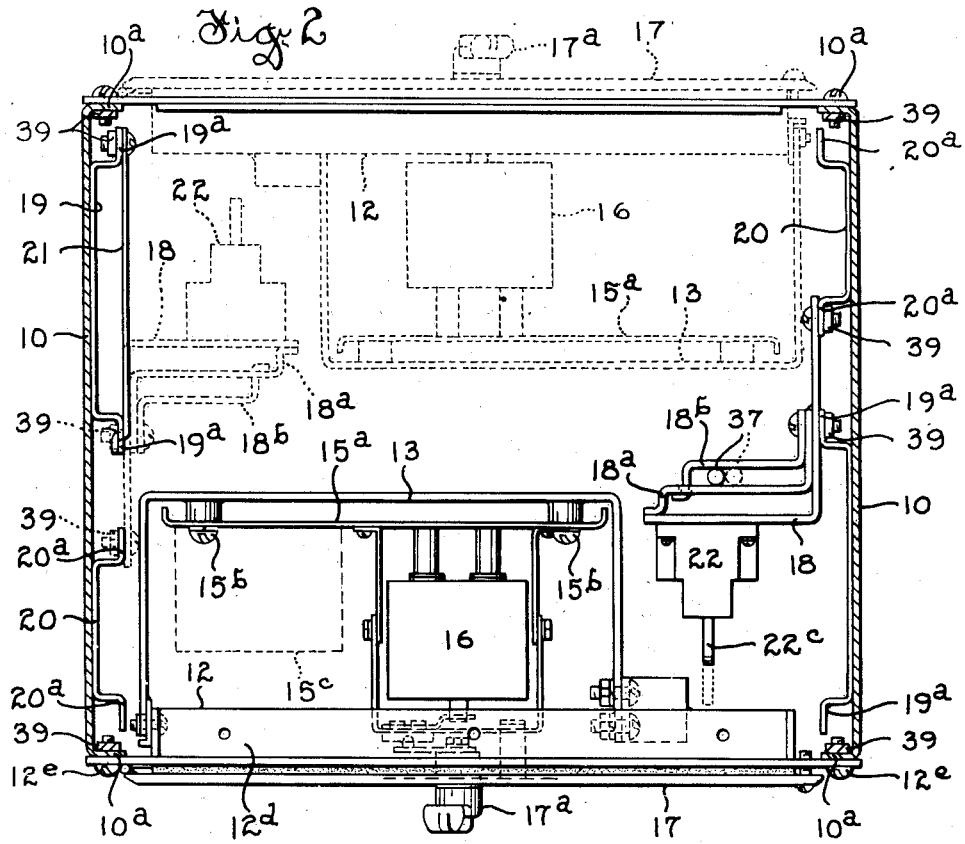
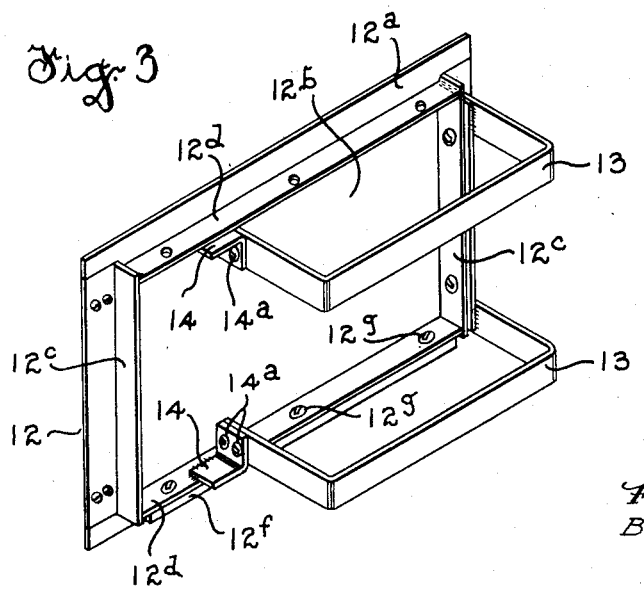
INVENTOR
Forrest C. McNicol.
BY
ATTORNEY

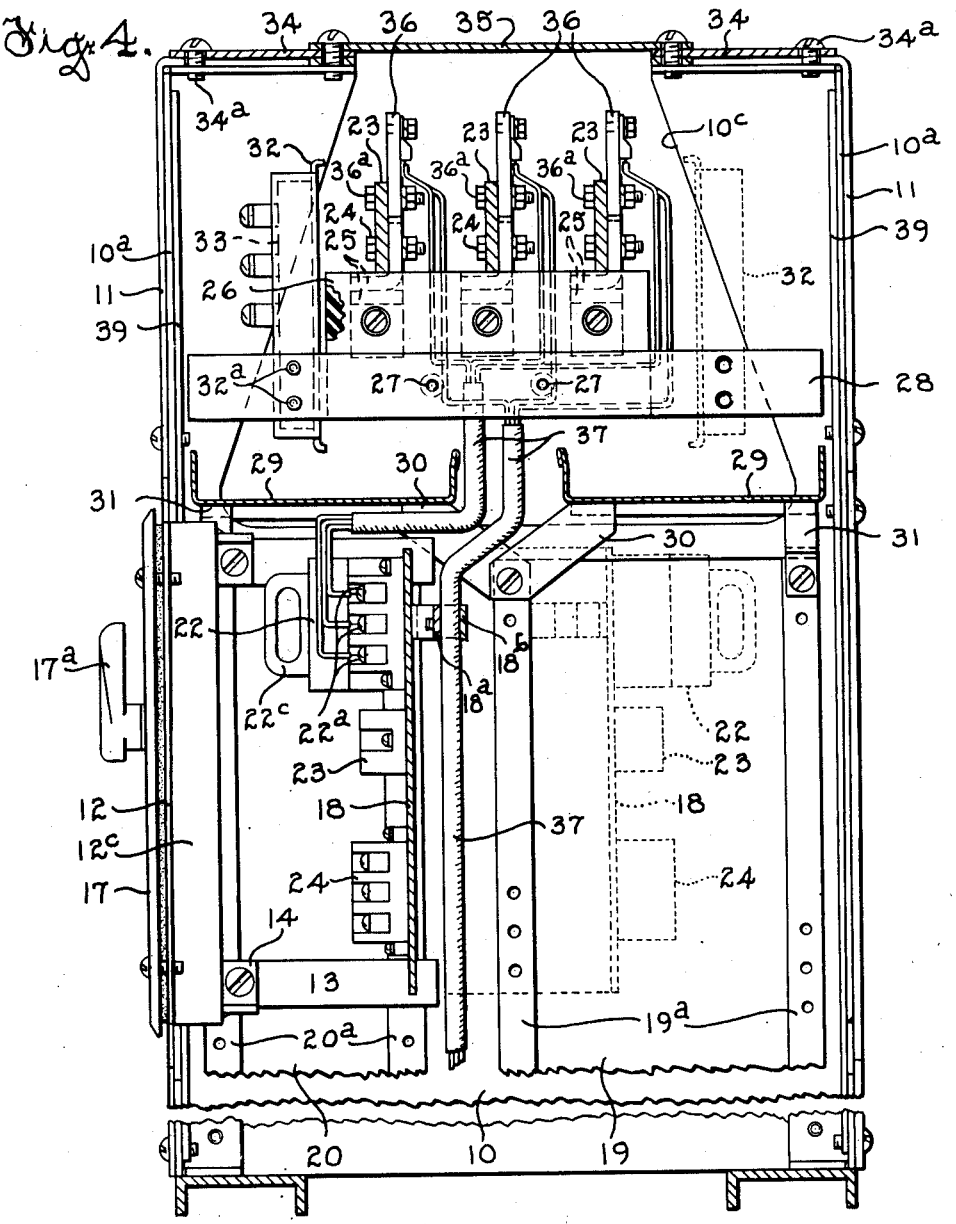

Nov. 17, 1953 — F. C. McNICOL — 2,659,843
ELECTRICAL CONTROL APPARATUS
Filed May 22, 1950 — 4 Sheets-Sheet 4

INVENTOR.
Forrest C. McNicol.
BY
ATTORNEY.

Patented Nov. 17, 1953

2,659,843

UNITED STATES PATENT OFFICE 2,659,843

ELECTRICAL CONTROL APPARATUS

Forrest C. McNicol, Milwaukee, Wis., assignor to Cutler-Hammer, Inc., Milwaukee, Wis., a corporation of Delaware Application May 22, 1950, Serial No. 163,417

11 Claims. (Cl. 317—112)

This invention relates to electrical control apparatus and more particularly to improvements in self-supporting control centers of the type exemplified by that disclosed in the Lightfoot Patent No. 2,319,415.

As will be understood, control centers of the aforementioned type are ordinarily composed of a number of individual control units, normally of the open panel type, supported within self-supporting enclosures. Electrical energy is ordinarily supplied to each of the aforementioned control units from horizontal bus bars running across the top of such enclosures by means of a set of vertical bus bars for each vertical section of the control center, the line side of each control unit being connected directly to such vertical busses.

An objection to the aforedescribed arrangement has been that in removing an individual control unit from its enclosure for repair, replacement, or rearrangement of the control center (a primary advantage of such control centers being the flexibility of arrangement afforded thereby), it has heretofore been necessary for an electrician to disconnect "hot" wires connecting the control unit to the vertical bus member. Moreover, upon removal of the control unit "hot," uninsulated vertical busses were left exposed with consequent danger of injury to persons coming in contact therewith.

One attempted solution to this problem has been to provide each control unit with a plug-on or "clothes-pin" type connection with the necessarily uninsulated vertical busses so that the control unit could be disconnected from its source of electrical supply by mere movement thereof away from the vertical bus. This attempted solution however, has, in practice, been found disadvantageous in that such "clothes-pin" type connections are frequently found to stick or weld to the vertical busses, and since such connections are on the back of the control unit panel and relatively inaccessible, it has been very difficult to free the control unit for removal when so welded. Moreover, since the objective of such "clothes-pin" connection is to eliminate the danger to electricians from coming in contact with "hot" leads and busses in removing the unit, it is obvious that such an arrangement is not satisfactory. Furthermore, upon removal of the control unit from its enclosure, "hot" vertical busses are left exposed and constitute a real danger to those working about the control center.

The high resistance contact afforded by the "clothes-pin" type of connection, in addition to causing welding of the "clothes-pin" prongs to the vertical busses, has frequently caused difficulty in the form of single-phasing of the control unit.

Another disadvantage of control centers of the type exemplified by that of Patent No. 2,319,415 has been that terminal boards for the various control units have either been mounted so as to be accessible only through the back of the enclosing structure, thus preventing mounting of the latter against a wall, or alternatively the terminal boards for all the control units have been mounted in a top or bottom portion of each vertical section of the control center.

A primary object of the present invention is to overcome the aforementioned disadvantages of prior structures of the general type under consideration and more particularly to provide a construction enabling removal of individual control units from the enclosing structure after disconnection thereof from the electrical supply, and thus without the danger of contact with the "hot" line leads to the controller or a "hot" uninsulated vertical bus member, but at the same time to permit such disconnection of the control units individually and without affecting other control units housed in the enclosure.

More particularly an object of the present invention is to provide an isolating means individual to each control unit in the form of a switch whereby a control unit may be completely disconnected from the line and removed in safety.

Another object is to provide isolating means of the aforementioned character which cannot be accidentally operated to reconnect its associated control unit to the source of electrical supply.

Another object is to eliminate uninsulated vertical bus members in electrical control apparatus of the aforementioned character.

A further object of the invention is to provide isolating means of the aforementioned character which will be accessible from the front of the enclosing structure, but which will be supported within such enclosing structure separately from the control unit associated therewith, thus affording removal of the control unit without disturbing the isolating means.

Another object is to provide for mounting of terminal boards individual to and adjacent each control unit, which boards will be accessible from the front of the enclosing structure but which will not be disturbed by removal of the control unit therefrom.

Another object is to provide a mounting means common to isolating means and a terminal board which are individual to each control unit and not required to be removed with the control unit, as aforementioned, while affording access to the several units through the front of the enclosing structure, but which nevertheless may be concealed behind the same door which conceals and closes off the opening behind which its associated control unit is mounted.

Another object is to improve the arrangement of the wiring to the line side of each control unit and to render the same simpler and more readily accessible.

A still further object is to afford the aforementioned advantages while at the same time permitting "back to back" mounting of control units within the same enclosing structure, and without requiring an increase in the overall depth of the latter.

Another object is to generally improve the construction and arrangement of electrical control apparatus of the aforementioned character.

Various other objects and advantages of the invention will hereinafter appear.

The invention will now be described, particularly with reference to the embodiments thereof illustrated in the accompanying drawings, it being understood that the embodiments illustrated are susceptible of modification in respect of certain structural details thereof within the scope of the appended claims.

In the drawings,

Fig. 2 is a horizontal sectional view, taken on the line 2—2 of Fig. 1, with addition, in dotted line showing, of a second control unit which may be mounted in back to back relation with the control unit illustrated in Fig. 1.

Fig. 3 is a detail perspective view illustrating one of the door frames utilized in forming control centers of the character described and affording mounting of a control unit.

Fig. 4 is a fragmentary side elevational view of one section of a control center with its side plate removed and certain parts being shown in section for purposes of illustration. The dotted line showing of parts at the right is illustrative of the general positioning and arrangement where it is found desirable to mount control units in back to back relationship.

Figure 5:
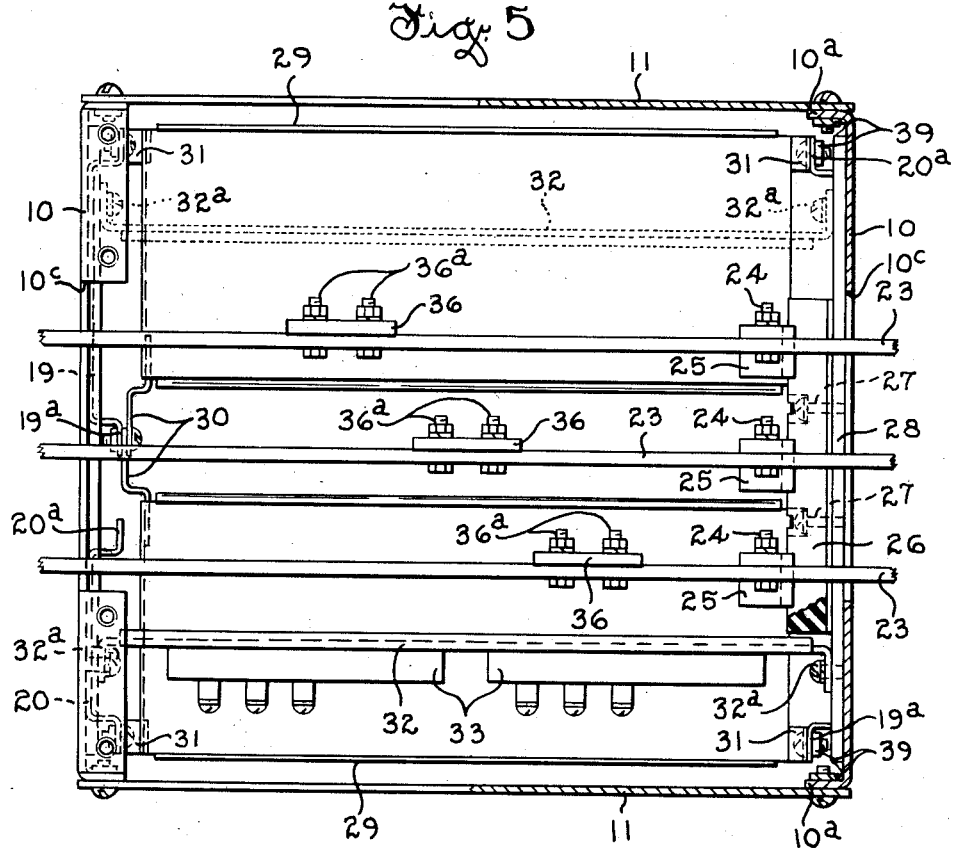
Figure 6:
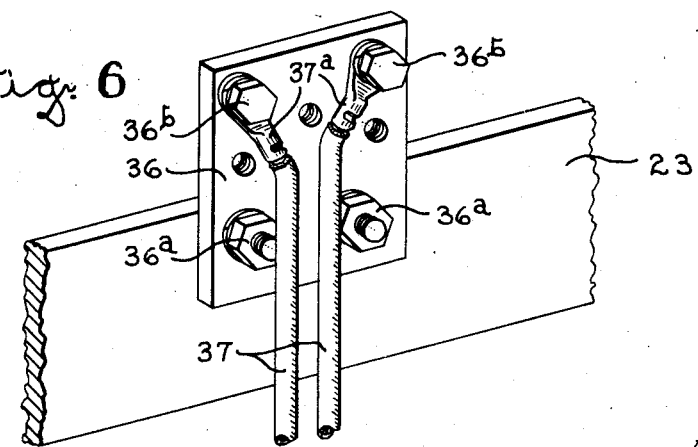

Fig. 5 is a top plan view of the upper portion of one section of a control center of the character herein contemplated, the top plates being removed and certain parts being shown in section for purposes of illustration. An additional terminal board mounting panel which may be utilized if desired is shown in dotted lines for purposes of illustrating its general positioning; and Fig. 6 is a fragmentary detail view illustrating the mode of attachment of wiring to bus bars utilized in the structure.

Referring to the drawings, there is shown one vertical section of a control center of the type disclosed in the Lightfoot Patent No. 2,319,415, to which reference may be had for the details of construction thereof, the following brief description of the general construction being merely to facilitate understanding of the improvements constituting the present invention.

As will be understood, control center sections of the type herein disclosed are built from standard size sheet metal side plates 10 (Figs. 1 and 2) having inturned edges 10$^a$ perforated as at 10$^b$ to afford attachment thereto of cross members 11 of preselected length defining the width of the section, said side plates being adapted to support therebetween control units of various sizes. As more fully described in the aforementioned Lightfoot patent, such control units are preferably carried by door frames 12 (Fig. 3) which are adapted to be secured to the side plates 10 of said sections, although it is to be understood that other or alternative ways of supporting such control units to afford mounting thereof within the section will readily suggest themselves to those skilled in the art.

As best shown in Fig. 3, an improved form of door frame 12 constructed in accordance with the present invention consists of a rectangular sheet metal frame 12$^a$ defining a central cut out portion to provide a door opening 12$^b$, integral portions of the frame being bent or turned inwardly at right angles to form vertical flanges 12$^c$ and horizontal flanges 12$^d$. A pair of U-shaped brackets 13 are secured at predetermined spaced points to one of the flanges 12$^c$ as by spot welding, one of said brackets 13 being located adjacent the top and the other adjacent the bottom of door opening 12$^b$ and each of said brackets extending part way across the door opening 12$^d$ to a predetermined attachment point on the upper and lower horizontal flanges 12$^d$ respectively. Said last mentioned attachment is preferably accomplished by use of L-shaped brackets 14 secured to the upper and lower horizontal flanges 12$^d$ respectively as by spot welding; the inwardly turned portions thereof affording attachment of the ends of brackets 13 thereto as by means of bolts or screws 14$^a$.

Figure 1:
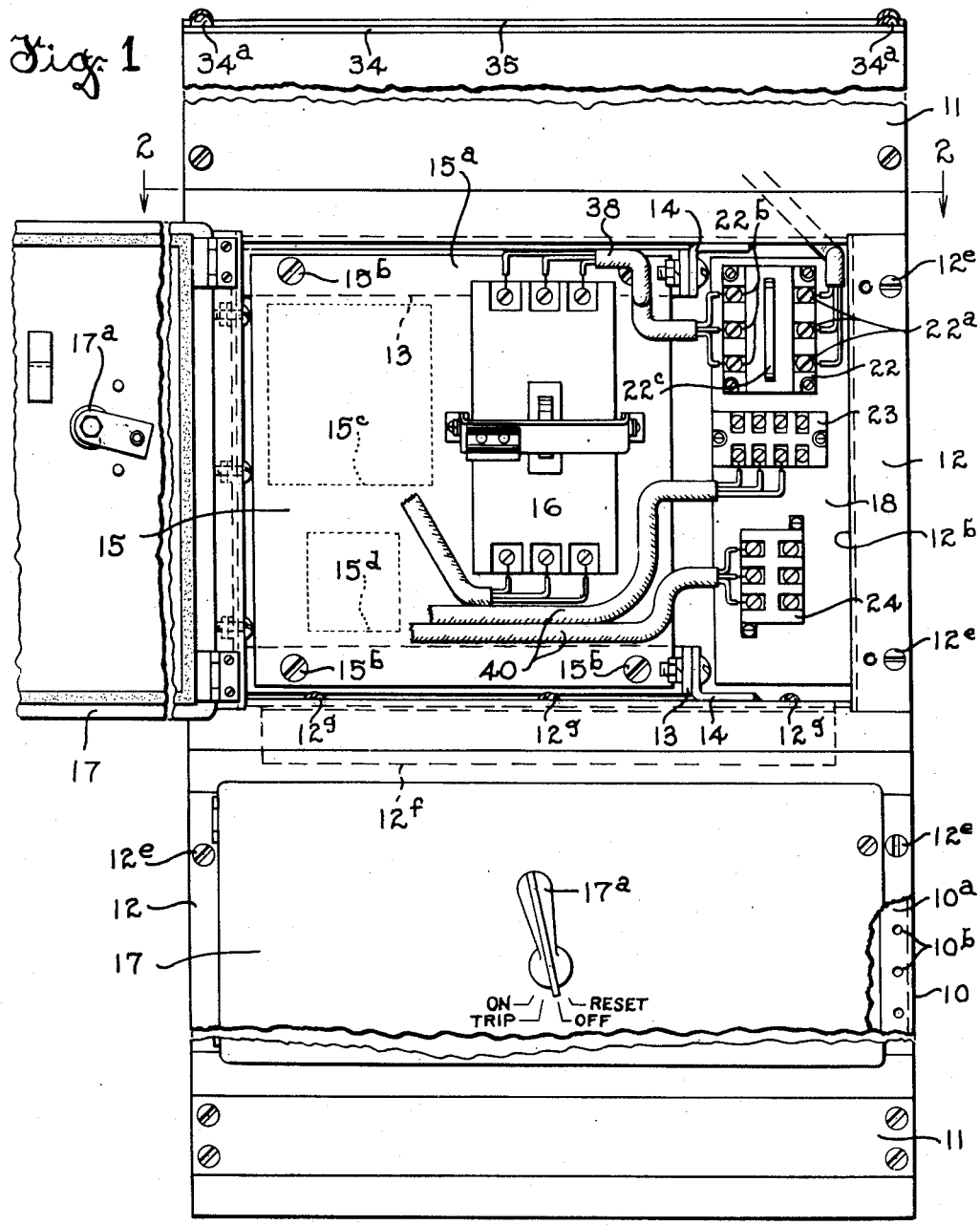
Figure 1 is a fragmentary front elevational view of one section of a control center of the character aforedescribed and illustrating the arrangement of a control unit and its associated isolating switch and terminal boards.

As will be understood, brackets 13 are adapted to support a control unit 15 (Fig. 1) preferably of the open panel type by attachment of its panel 15$^a$ thereto as at 15$^b$ (Fig. 2), the frame 12 and control unit 15 being insertable as a unit into a receiving opening between side plate 10 as best illustrated in Figs. 1 and 2. The frame portion 12$^a$ is adapted to overlie the inturned edges of said side plates for removable attachment thereto as by screws 12$^e$ (Fig. 1). As illustrated, when the frame 12 is so attached, the panel of control unit 15 extends only part way across the width of the receiving opening. As will be understood, a plurality of the aforedescribed assemblies may be mounted in vertical arrangement on side plates 10 to form one vertical section of a control center of the character under consideration, each frame 12 being provided on its lower edge with an overlapping strip 12$^f$ (Fig. 1) attached thereto as by bolts 12$^g$ to underlie the top of the next lower assembly, such strips acting during tilting of said door frame during removal or insertion thereof in said receiving opening to prevent outward displacement of the lower edge of the frame.

Control units 15 may comprise any type of electrical apparatus preferred, as for example, a motor starter, in which case a disconnect switch or circuit breaker will normally be included. In the control unit illustrated in the drawings, the dotted line rectangles 15$^c$, 15$^d$ represent any desired electrical control apparatus, while additionally the control unit is shown as including a circuit breaker 16 of well known form, such breaker being provided to disconnect the load from the control unit and to afford overload protection.

A door 17 is provided to close each of the aforementioned receiving openings, and to conceal the control unit and other means to be hereinafter described mounted therein, said door preferably being carried by door frame 12 and hence removable therewith. As is well understood, such door may be provided with a variety of external means of well known form for operation of certain apparatus of the control unit concealed thereby when the door is closed, the operator 17a illustrated (Fig. 1) being adapted for operation of circuit breaker 16 and to afford external indication of the condition thereof. Such operators may, of course, be interlocked with their respective doors in a well known manner to require movement of the circuit breaker or disconnect switch, if utilized, to "off" position for disconnection of the load from the control unit before the door can be opened.

As aforestated, the control unit panel 15a and its supporting brackets 13 extend only part way across the width of the receiving opening defined by side plates 10, the remainder of such width being provided for mounting side by side with panel 15a of a second panel 18 accessible from the front of said opening for supporting apparatus to be hereinafter described; although it will be apparent to those skilled in the art that such second panel might alternatively be positioned above or below panel 15a as well as at a side thereof. Panel 18 is supported separately from panel 15a; that is, panel 18 is preferably attached to a side plate 10 to afford removal of control unit 15 from its receiving opening while panel 18 and the apparatus mounted thereon remains fixed within the receiving opening. More particularly, side plates 10 have attached thereto pairs of flanger U-shaped members 19, 20 extending vertically substantially the height of side plates 10 and affording vertical wiring troughs for each vertical section of the control center, said pairs of troughs as best shown in Fig. 2 being of different widths and like troughs of the respective pairs being disposed at diagonally opposite corners of the section. All of said troughs are provided with a sufficient number of vertically spaced wire retaining straps such as that illustrated at 21 (Fig. 2). Each of said U-shaped wiring troughs 19, 20 has integrally formed laterally extending flange portions 19a, 20a (Fig. 2) having bolt holes spaced at predetermined intervals. Panel 18 is of L-shape, one arm thereof being secured as by bolts to flanges 19a, 20a of the aforementioned wiring troughs, while the other arm thereof lies in a plane parallel to and substantially in alinement with the face of panel 15a (Fig. 2), thus affording mounting of apparatus to be presently described in side by side relationship with and within the vertical dimension of each of the control units 15 and being similarly accessible from the front through opening 12b of door frame 12 when its door 17 is opened. A bracket 18a (Fig. 2), preferably spot welded to the back of panel 18, is provided to strengthen each panel 18, and a wire retaining strap 18b is preferably attached thereto for retaining wiring to be hereinafter described.

Mounted on the front accessible face of said panel 18 are first a switch 22, preferably of the type disclosed in the copending application of Martin F. Koenig and Ralph A. Millermaster, Serial No. 135,088, assigned to the assignee of the present application, such switch to be interposed between the control unit associated therewith and its source of electrical supply to afford individual isolation of the control unit therefrom at will as will hereinafter appear. As will be understood, such a switch preferably comprises line terminals 22a and load terminals 22b each electrically connected to suitable stationary contacts (not shown) to be bridged by a set of contactors carried by a plate-like operator 22c (Fig. 4) which when pulled to its outermost position (Fig. 2) interrupts the flow of current therethrough. As illustrated in the aforementioned patent application, Serial No. 135,088, such switch operators may be provided with a latch to prevent accidental closing of the switch, or may be constructed to afford complete withdrawal of the operator and the contactors carried thereby for the same purpose. As illustrated, switch 22 is shown with three poles to afford interruption of the power circuit to its associated control unit, although it is to be understood that additional poles may be provided to afford interruption of any control circuits where a given control unit is electrically interlocked with other control units in the control center; or terminal board 23, hereinafter described, might comprise a switch similar to switch 22 to afford interruption of such circuits.

Terminal boards 23, 24 (Fig. 1), individual to each control unit, may also be mounted on the face of panel 18, those illustrated in Fig. 1 comprising a control terminal board 23 and a motor or load terminal board 24. As will be apparent, such mounting affords easy accessibility to the terminal boards of each control unit from the front of the section through openings 12b upon mere opening of door 17.

Referring now primarily to Figs. 4 and 5, the upper portion of each vertical section of the control center preferably is utilized to house horizontally disposed bus bars 23 affording a common source of electrical supply for all control units in the control center, such bus bars being supported approximately midway of the depth of the section for reasons which will hereinafter become apparent, and which bars are further supported within the section with the required electrical clearances from all other parts. More particularly, bus bars 23 are attached as by bolts 24 to brackets 25 supported by a block of insulating material 26, which is in turn attached as by screws 27 to a supporting plate 28 preferably welded to a side plate 10, as shown in Figs. 4 and 5. Side plates 10 are each provided with a cut out section or notch 10c (Fig. 4) to permit bus bars 23 to extend into adjacent sections, if any, it being understood that at least one end section of the control center may be provided with a plate (not shown) of the type illustrated in the aforementioned Lightfoot patent to afford connection of conduit carried conductors.

The aforedescribed top portion of each vertical section is additionally provided with a pair of horizontal wiring troughs 29 (Fig. 4) supported in place by pairs of brackets 30, 31, preferably attached by screws to the flange portions 19a, 20a of the vertical wiring troughs 19, 20.

Additionally, the top portion of each vertical control section may be provided with one or more panels 32 extending the width thereof for mounting of additional terminal boards, as for example, those shown at 33 in Fig. 5. Terminal board panels 32 are also supported by plates 28 as by attachment thereto by screws 32a (Fig. 5).

It will be understood that if convenience dictates, horizontal wiring troughs similar to troughs 29, and terminal board panels similar to those shown at 33 may be located in a bottom portion of each vertical section, the mode of attachment and support thereof by side plates 10 being substantially similar.

As best shown in Fig. 4, the aforedescribed top portion of each vertical control section is enclosed at the top by three plates, the outer pair 34 being attached to the inturned edges of side plates 10 and 11, as by screws 34$^a$, while a center plate 35 is adapted to overlap the two side plates and is removable to afford access from the top of the section to bus bars 23 and certain wiring to be hereinafter described.

Each of the bus bars 23 is preferably provided with a tap off member 36 (Fig. 4) attached thereto as by bolts 36$^a$, the tap off members 36, as shown in Fig. 5, being staggered with respect to their longitudinal placement on bus bars 23. Connected to such tap off members are insulated wires 37 individually connecting each of the isolating switches 22 to bus bars 23 and their common source of electrical supply. As best illustrated in Fig. 6, wires 37 are attached to the respective tap off members preferably by solderless connectors 37$^a$ attached as by screws 36$^b$ to the tap off member.

As best shown in Fig. 4, wiring 37 is run from the bus bars 23 down between the inner edges of horizontal wiring troughs 29 and behind panel 18, thence to the line side of their respective isolating switches, the wiring to the isolating switches of control units lower in the section being retained between the mounting brackets 18$^a$ and wire retaining straps 18$^b$ as best illustrated in Fig. 2. As will be apparent, the one end connection of each of the wires 37 to bus bars 23 is accessible by removal of top plate 35, while the other end, connected to an isolating switch is accessible from the front of the section through the receiving openings therein as aforedescribed.

From the load side of each of the isolating switches, insulating wiring 38 runs to the terminals of the circuit breaker 16 through which electrical current is supplied to the other electrical apparatus of the control unit. As will be understood, wiring 40 (Fig. 1) is then utilized to connect such electrical apparatus to the terminal boards 23, 24, from which other wiring (not shown) extends, through the aforedescribed vertical and horizontal wiring troughs, to the load and in some cases to other control units or to other electrical apparatus.

As best illustrated by the dotted line showings of Figs. 2 and 4, control units similar to that shown in Fig. 1, together with similarly associated isolating means and terminal boards, may be conveniently mounted on the back side of the control section where the latter is not placed against a wall. Such back to back arrangement may be utilized without increasing the depth of side walls 10 since the use of insulated wiring 37 running down from the bus bars to the isolating switch of each control unit eliminates the greater space for electrical clearance necessary where uninsulated vertical bus bars are utilized for this purpose. Moreover, upon removal of a control unit from its receiving opening no uninsulated and exposed "hot" vertical bus bars are present to constitute a danger to persons working about the control center or whose curiosity might cause them to touch such busses.

As will be apparent, the aforedescribed construction and arrangement of vertical sections of a control center inherently affords removal of each control unit in safety and without disturbing the operation of other control units in the center. In preparation for such removal of a control unit for repair, replacement, and/or rearrangement, the circuit breaker or disconnect switch, if utilized, is first operated to disconnect the load. The isolating switch 22 is then operated to completely deaden electrical connections to the control unit associated therewith. The wiring from the isolating switch to the control unit may then be mechanically disconnected from the then deadened terminals 22$^b$ of the isolating switch 22, and similarly wiring from the control unit to the terminal boards 23, 24 may be mechanically disconnected at the terminal boards. Thus all mechanical disconnection of wiring is done on the front accessible panel 18 at deadened terminals, and the wiring on panel 15$^a$ and the wiring from terminal boards 23, 24 to the load or other electrical apparatus remains undisturbed.

To remove the control unit from its receiving opening, it is then necessary merely to remove the four screws 12$^c$ by which frame 12 is attached to side plates 10, frame 12 and the control unit 15 supported thereby being then removable as a unit while the separately mounted panel 18 and the isolating switch 22 and terminal boards 23, 24 carried thereon remain fixed within the receiving opening.

To facilitate removal of screws 12$^c$ and substantially all other screws utilized in the construction of the aforedescribed section, tapped strips 39 (Fig. 2) into which such screws take are utilized wherever possible in lieu of individual nuts for each screw, such strips running vertically substantially the entire height of the control section, thus eliminating the annoyance of nuts dropping into the interior of the section.

I claim:

1. The combination with a plurality of self-contained electrical control units of the panel type, a self-supporting enclosure having a receiving opening for each of said units, and a plurality of frames removably attached to said enclosure and having means for supporting said control units within said enclosure with their panels facing said receiving openings, of means interposed between each of said control units and its source of electrical supply to afford individual isolation of said units therefrom, said isolating means having separate mounting within said enclosure rendering said isolating means accessible through said openings in said enclosure and permitting removal of said control units without disturbance of their associated isolating means, and means for preventing operation of said isolating means while its associated control unit is connected to its load.

2. The combination with a plurality of self-contained electrical control units of the panel type mounted within a self-supporting enclosure having a receiving opening for each of said devices of dimensions greater than the maximum dimensions of its panel, of a switch interposed between each of said control units and its source of electrical supply affording individual isolation of said units, a terminal board mounted within each of said receiving openings and individual to its associated control unit, and a door covering each of said receiving openings for concealing a control unit and its associated isolating switch and terminal board, the unit, the switch and the board all being accessible through said receiving opening upon opening of said door, each of said units being removable separately from its associated isolating switch and terminal board after setting of the switch to deaden terminals of the board and switch and after mechanical disconnection of the unit from the thus deadened terminals.

3. The combination with self-supporting enclosing structure and electrical control units of the panel type to be mounted therein, said enclosure having a receiving opening for each of said units of dimensions greater than those of its panel, of means separately mounted within said enclosure and electrically interposed between each of said units and its source of electrical supply affording isolation of the unit from the source of supply after disconnection of the unit from its load, and door frames removably attached to said enclosure to overlie the receiving openings thereof, and each door frame having means affording support of a control unit with the panel of the latter facing the opening of the door frame, and a door on each door frame to conceal the unit supported thereby and also the associated isolating means, each door frame and the control unit supported thereby being removable from said enclosure as a unit leaving in place in the enclosure the associated isolating means.

4. The combination with self-supporting enclosing structure having receiving openings and self-contained control units of the panel type having means removably attached to said enclosing structure for supporting said control units therein with their panels facing said receiving openings, of switches interposed between said units and their source of electrical supply for individually isolating said units therefrom after disconnection of the unit from its load, terminal boards individual to said control units, and mounting plates for said switches and said terminal boards attached to said enclosing structure separately from said control units to permit of removal of said control units while said isolating switches and terminal boards remain fixed, the latter being so supported by said plate as to be accessible through said receiving openings.

5. The combination with self-supporting enclosing structure for electrical control units comprising parallel side walls and parallel connecting walls, the latter walls being at least in part removable and at least one of the same comprising readily attachable and detachable door frames each having fixed thereto at the rear thereof one of said control units with its panel facing the opening of the door frame, and each door frame having thereon a door, of means in said enclosing structure interposed between said units and their source of electrical supply for individually isolating said control units therefrom, said means as regards each control unit comprising a switch mounted on one of said side walls and having its operating means facing a door frame opening and accessible therethrough, the door frame and its control unit being removable as a unit without disturbing said switch.

6. The combination with self-supporting enclosing structure for electrical control units comprising parallel side walls and parallel connecting walls, the latter walls being at least in part removable and comprising readily attachable and detachable open frames each having fixed thereto at the rear thereof one of said control units with its panel facing the opening in said frame, and a door for closing each of said openings, of bus bars disposed horizontally between said side walls, switches individual to said control units but having mounting means separate therefrom for attachment thereof to and within said enclosing structure, and insulated wires connecting said bus bars to said switches and the latter to said control units, said switches affording individual isolation of each of said control units from its source of electrical supply after disconnection of the unit from its load, each switch when set for isolation rendering electrically dead the insulating wires leading therefrom to its associated control unit for safe removal of the latter.

7. The combination with a plurality of self-contained electrical control units of the panel type and self-supporting enclosing structure therefor comprising parallel side walls and parallel connecting walls, the latter walls being at least in part removable and comprising readily attachable and detachable open frames each having means for affixing thereto at the rear thereof one of said control units with its panel facing the opening in the frame, and each frame having a door for closing its said opening, of bus bars disposed horizontally between said side walls for supplying electrical current to said control units, switches and terminal boards individual to said control units and having mounting means separate from said control units for support thereof adjacent the control unit associated therewith and accessibility through said frame opening upon opening of its door, and insulated wires connecting each of said switches to said bus bars and to its associated control unit to enable isolation of the latter from its electrical supply after disconnection of the unit from its load, each switch when set for isolation rendering electrically dead the supply wires between the switch and its respective control unit for safe removal of the latter.

8. The combination with a plurality of electrical control units of the panel type, a self-supporting enclosure therefor comprising parallel side walls, sectional front and back walls, and a top wall having a removable center plate, certain sections of said sectional walls comprising frames defining a receiving opening and having affixed thereto at the rear thereof one of said units with its panel facing said opening, of a bus bar horizontally disposed between said side walls and adjacent said top wall for supply of current to said control units, a switch for each of said control units separately mounted adjacent thereto for isolating the control unit associated therewith from its electrical supply after disconnection thereof from its load, and insulated wires connecting each of said control units to its associated isolating switch and the latter to said bus bar, said wires running to said bus bar being disposed behind said panels and being insulated to afford required electrical clearances in a minimum space, thereby affording mounting of similar control units on said back walls without increase in the depth of said walls, said wires and said bus bar nevertheless being accessible through said top wall upon removal of said center plate.

9. The combination with self-supporting enclosing structures having a receiving opening and a self-contained electrical control unit of the panel type having means including a frame removably attached to said enclosing structure for supporting said control unit therein with its panel facing said receiving opening, of means interposed between said control unit and a source of electrical supply to afford isolation of said control unit therefrom, said isolating means having separate mounting within said enclosure rendering said isolating means accessible through said opening in said enclosure and permitting removal of said control unit without disturbance of its associated isolating means, and means for preventing operation of said isolating means while said control unit is connected to its load.

10. The combination with self-supporting enclosing structure having a receiving opening and a self-contained electrical control unit of the panel type having a frame removably attached to said enclosing structure for supporting said control unit therein with its panel facing said receiving opening, said receiving opening being of a width greater than the maximum width of said control unit, of means interposed between said control unit and a source of electrical supply to afford isolation at will of said control unit, said isolating means having separate mounting within said enclosure to afford removability of said control unit without disturbance of said isolating means, a cover for said receiving opening requiring opening for operation of said isolating means but carrying an operator for said control unit for operation of the later with the cover closed, and means for insuring against opening of said cover except when said control unit is disconnected from its load.

11. The combination with self-supporting enclosing structure having at least one receiving opening and a self-contained electrical control unit of the panel type having means removably attached to said enclosing structure for supporting said control unit therein with its panel facing said receiving opening, of a switch interposed between said control unit and a source of electrical supply to afford isolation of said control unit therefrom, a terminal board mounted within said receiving opening and individual to said control unit, a door covering said receiving opening for concealing said control unit and its associated isolating switch, said control unit, said switch and said terminal board all being accessible through said receiving opening upon opening of said door, and said control unit being removable separately from its associated isolating switch and terminal board after setting of said switch to deaden terminals of the board and switch and after mechanical disconnection of said control unit from the thus deadened terminals.

FORREST C. McNICOL.

References Cited in the file of this patent

UNITED STATES PATENTS

| Number | Name | Date |
|---|---|---|
| 1,885,365 | MacNeil | Nov. 1, 1932 |
| 1,929,983 | MacNeil | Oct. 10, 1933 |
| 1,968,619 | Reed | July 31, 1934 |
| 2,042,848 | Horn | June 2, 1936 |
| 2,106,061 | Paxton | Jan. 18, 1938 |
| 2,294,843 | Gage | Sept. 1, 1942 |
| 2,319,415 | Lightfoot | May 18, 1943 |
| 2,397,099 | Gates | Mar. 26, 1946 |
| 2,538,042 | Reilly | Jan. 16, 1951 |

FOREIGN PATENTS

| Number | Country | Date |
|---|---|---|
| 354,039 | Great Britain | Aug. 6, 1931 |